Dec. 17, 1968  T. P. HASELTON ETAL  3,416,972
INSULATED ELECTRICAL CONDUCTOR OR THERMOCOUPLE ASSEMBLY
WITH A MEMBRANE GAS-TIGHT SEAL
Filed Dec. 14, 1964
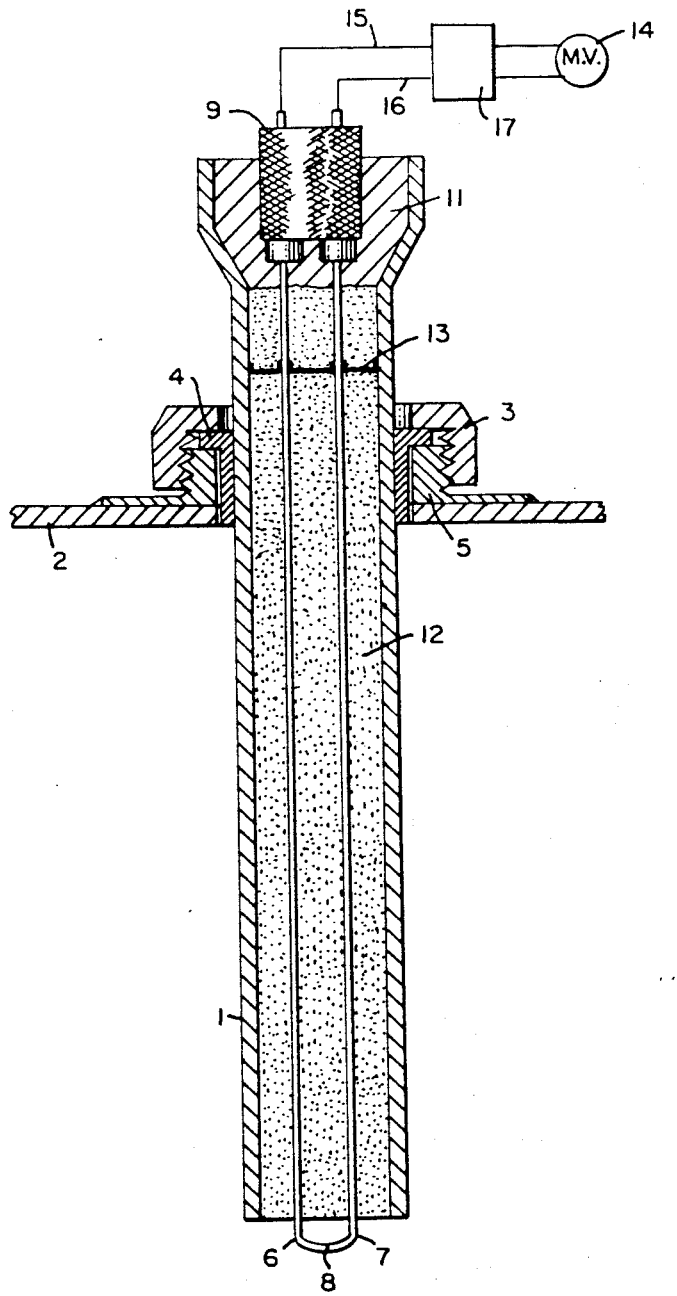
INVENTORS
THOMAS P. HASELTON
ROBERT A. PUSTELL
BY,
ATTORNEY

United States Patent Office 3,416,972
Patented Dec. 17, 1968

3,416,972
INSULATED ELECTRICAL CONDUCTOR OR THERMOCOUPLE ASSEMBLY WITH A MEMBRANE GAS-TIGHT SEAL
Thomas P. Haselton, Lynn, and Robert A. Pustell, Melrose, Mass., assignors to General Electric Company, a corporation of New York
Filed Dec. 14, 1964, Ser. No. 418,139
7 Claims. (Cl. 136—230)

This invention relates to improvements in insulated electrical conductors and has particular reference to insulated electrical conductors requiring gas-tight seals to prevent the leakage of gas through the compacted mineral insulation.

One common example of such a conductor may be found in exposed junction thermocouples. These types of devices have been found to be necessary in certain missile applications in order to obtain a thermocouple having an extremely fast response time. Commonly, these thermocouples take the form of a swaged tubular sheath having compacted mineral insulation between the housing and the conductors. These applications, which result in exposing the thermocouple to high pressures, also expose the compacted insulation to such pressures. Such thermocouples, which may be completely suitable for normal low-pressure applications, leak when the exposed end is subjected to either a high pressure or a high vacuum. It has been found that, under these conditions, leakage takes place in a longitudinal direction between the conductors and the sheath through the powdered insulation in spite of its highly compacted state. Pressures of the order of 2,000 p.s.i.g. are commonly encountered in missile applications.

Prior art attempts to provide the necessary insulation have revolved about the insertion of a resilient member of considerable relative thickness into the end of the thermocouple exposed to the vacuum or pressure. The resilient material is commonly retained within the exposed end by utilizing a harder retaining disk of insulating material which is placed inside the end of the sheath. The retaining disk is, in turn, retained within the end of the sheath by crimping the sheath edges.

The resilient members are conventionally placed in compression either by swaging the housing in the plane of the resilient member or by applying pressure longitudinally to force the retaining disk into the casing by means of suitable tools, or both. In any case, it has been found that the resulting seal will not operate without leakage at the pressures or vacuums contemplated in missile applications due to the inability to apply sufficient pressures to the resilient sealing member without damage to some part of the assembly.

It is therefore an object of this invention to provide a metallic sheathed electrical device containing compacted powder insulation which will operate under conditions of high temperature and pressure.

It is another object of this invention to provide an improved thermocouple for measuring fluid temperatures under conditions of extreme pressure or vacuum.

According to our invention, we provide, in a thermocouple of the nature described, a core of powdered insulating material within the tubular thermocouple sheath and surrounding the spaced thermocouple conductors. Intermediate the ends of the sheath, we have provided a thin, resilient sealing membrane which is placed under compression during a compacting operation in which the cross-section of the sheath has been reduced a substantial amount, e.g., 20%.

It is another feature of this invention that we provide a sealing membrane which is thin enough, considering the nature of the insulating powder, the type of membrane material, and the magnitude of the forces involved, to prevent the pressure applied to the conductors by the sealing membrane from reaching the point which will cause the conductors to be compressed or extruded to a substantially smaller diameter at these points as compared with the remaining portions of the conductors.

The aforementioned and other objects and features of this invention may be noted in greater detail in the following description wherein reference is made, by way of example, to the single figure of the drawing illustrating a partially cross-sectioned and partially pictorial view of a thermocouple assembly embodying our invention.

Referring to the drawing, the tubular thermocouple sheath 1 is shown installed by a mounting through an aperture in the wall 2 of a chamber containing a fluid under conditions of high pressure or high vacuum. This mounting includes a nut 3 having an internal annular flange which bears against a flange 4 fixed to one end of the thermocouple sheath 1. Flange 4, in turn, rests on an externally threaded mounting member 5 which is welded to the chamber wall 2 in a gas-tight relationship. Tubular sheath 1 may be made of stainless steel, or other suitable material, and a pair of thermocouple conductors 6 and 7 of dissimilar metals run longitudinally through this sheath, terminating in a protruding junction 8 at one end and in connections with an insulating coupling cable 9 at the mounting end. The mounting end of sheath 1 contains a potting material 1 which serves to fix the cable firmly in position and may act as an auxiliary, unpressurized gas or moisture seal at this end of the sheath.

Dissimilar conductors 6 and 7 may be of the type commonly employed in thermocouple pyrometry, e.g., 24 gauge iron-constant (ISA TYPE J) thermocouple wire. Junction 8 may be rendered secure by welding. Insulation and positioning of conductors 6 and 7 are achieved by a core 12 which is preferably comprised of an insulating powder loaded into the sheath by any one of several ways common to the state of the art and extending fully between the conductors and the internal surface of the sheath. Suitable powders include, for example, magnesia or alumina, or other powders commonly utilized.

During the operation in which powder is added to sheath 1, the filling operation is interrupted so that resilient sealing membrane 13 may be inserted into sheath 1 at a proper location to provide the required seal. After this member has been properly placed at this location, the filling operation is completed so that the remainder of the sheath on both sides of the member is filled.

The location of membrane 13 with respect to the hot junction end of the thermocouple will, of course, be dictated by the temperatures to which this end is exposed as well as the temperature which sealing membrane 13 can withstand. In the preferred embodiment of our invention, membrane 13 comprises a thin sheet of polytetrafluoroethylene plastic sold by DuPont Company under the trademark "Teflon." This material can withstand temperatures of the order of 700° F. and thus may be placed relatively close to the plane of wall 2.

The diameter of the sheet forming the membrane is made larger than the inside diameter of sheath 1 so as to permit it to lap up the sides of sheath 1, and the apertures in membrane 13 are made so that a tight fit will be obtained between the membrane and conductors 6 and 7 when the membrane is slid over these conductors during the filling operation so as to prevent excessive entry of powdered insulation between it and the conductors or inner surface of the sheath. After the sheath has been filled to the desired point with insulating powder, the powder is firmly packed therein, the ends capped, and then the sheath may be subjected to a compacting operation which causes the solidification or jamming of the insulation powder of core 12 so that it will not flake out of either end of the sheath after the conventional compacting operation has been completed and the end plugs are removed. Typical compacting operations are swaging, drawing, rolling, stamping, etc.

In order to measure the electrical output of the thermocouple and thus obtain an indication of the temperature at junction 8, there is provided a conventional millivoltmeter 14 which is connected to the thermoelectric conductors 6 and 7 by conductors 15 and 16 and reference junction 17.

It has been found that in a swaging operation wherein the outside diameter of sheath 1 is reduced a substantial amount, e.g., 20%, the forces that can be generated can result in extruding or necking-down conductors 6 and 7 at their points of contact with membrane 13 if this membrane is not thin enough. In this regard it has been found that 24 gauge conductors will not be extruded when a 5 mil Teflon sheet is utilized in a sheath of stainless steel having an ID of .157 prior to the swaging operation and an ID of .120 after this operation. It has been found that when extruding does take place, the forces that perform this operation are hydraulically applied to the conductors by the sealing membrane 13. Furthermore, surprisingly enough, the utilization of such a thin sheet does not interfere with the establishment of a proper seal for preventing leakage through core 12. Even though this phenomenon is not completely understood, it appears that when a sealing membrane is thin enough, the rough nature of the surface provided by the powdered insulation in contact with the membrane will prevent or block the flow of material of sealing membrane 13 toward the conductors. Thus, pressures cannot be hydraulically applied to the conductors. On the other hand, if the membrane is too thick, this flow will readily take place through the middle of the membrane, permitting the conductors to be extruded.

It also appears that sealing membrane 13 effectively seals the interstices between the minute particles of powder by actually flowing into these interstices and filling all voids across a region of core 12. It appears that, in doing so, the minute protrusions on the opposing surfaces of core 12 contacting the membrane actually perforate the sealing membrane. Therefore, the sealing operation, in accordance with our invention, does not depend upon maintaining an unperforated surface, as is the case with prior art devices, but performs the sealing function by filling all voids across core 12.

Short thermocouples constructed in accordance with our invention have reliably operated at temperatures up to 1,500° F. and at pressures of 2,000 p.s.i.g. without any leakage being detected by mass spectrometer or soap bubble tests for test times in excess of ten minutes.

A silicone rubber membrane has also been found to be suitable for constructing sealing membrane 13. This material may be selected when it will be located so that the temperature to which it will be exposed does not exceed 500° F. Other materials possessing a wide variety of characteristics may also be used so long as appropriate initial or loading size changes are made to prevent wire or sheath damage during compaction and the sealing agent completely fills all powder voids in a continuous path across the core 12.

It has been found that when utilizing a sheath having an outside diameter of .187 inch and an inside diameter of .157 inch, which dimensions are later reduced during the compaction operation to .150 inch and .120 inch, respectively, the compacted powder insulation should extend a minimum of approximately .5 inch from each surface of the membrane so that the powder will continue to exert the required compressive forces upon the sealing membrane. In so doing, we have provided a thermocouple which will be able to withstand extreme pressures or vacuums without leakage through the powdered insulation and without damage to the conductors or sheath.

Although this invention has been described by reference to a particular embodiment thereof, it will be understood by those skilled in the art that numerous modifications and substitutions may be effected without departing either in spirit or scope from this invention in its broadest form. For example, a plurality of serially positioned resilient sealing membranes may be utilized in applications wherein even higher pressures or lower vacuums are to be encountered. Furthermore, this sealing technique can be utilized in heaters which are subjected to high pressures or low vacuums or require positive moisture seals at lower pressures.

What we claim as new and desire to secure by Letters Patent of the United States is:

1. A device for conducting electricity under conditions of high pressure and temperature comprising a metallic sheath, a conductor extending longitudinally through said sheath, a thin, resilient sealing membrane generally transversely positioned at an intermediate point in said sheath and having an aperture for receiving said conductor, said membrane having portions lapped up and in contact with said metallic sheath and said conductor, and refractory insulating powder filling the remainder of said sheath on both sides of said membrane and being in intimate contact with said membrane, said powder being held in a highly compacted state by said sheath so as to place said membrane in compression and bring it into sealing engagement with said conductor, said sheath, and said powder to prevent gas leakage in a longitudinal direction within said sheath under the applied pressure.

2. A thermocouple for measuring fluid temperatures under conditions of high pressure and temperature comprising a metallic sheath, a pair of conductors of dissimilar metals extending longitudinally through said sheath, a thin, resilient sealing membrane generally transversely positioned at an intermediate point in said sheath and having a pair of apertures for receiving said conductors, said membrane having portions lapped up and in contact with said metallic sheath and said conductors, and refractory insulating powder filling the remainder of said sheath on both sides of said membrane and being in intimate contact with said membrane, said powder being held in a highly compacted state by said sheath so as to place said membrane in compression and bring it into sealing engagement with said conductors, said sheath, and said powder to prevent gas leakage in a longitudinal direction within and sheath under the applied pressure.

3. The combination of claim 2 in which said membrane is thin enough so that when said powder is compacted, the forces applied will be sufficient to provide the required sealing engagement but will be less than that which would cause the conductors to become compressed into a substantially smaller cross section at their points of contact with said membrane.

4. The combination of claim 3 in which said insulating powder comprises a mineral insulation and said membrane comprises a sheet of polytetrafluoroethylene plastic.

5. The combination of claim 4 in which said sheath is tubular and exerts forces on said powder and said membrane which correspond to the forces resulting from a compacting operation in which diameter reduction of greater than 10% takes place, said membrane being approximately 5 mils thick.

6. The combination of claim 5 in which the compacted powder terminates within said sheath in substantially unsupported ends, said ends being retained in place due to their highly compacted state, said terminating ends being spaced from said membrane a sufficient distance so as to permit the powder to exert the required forces upon said sealing membrane.

7. The combination of claim 6 in which said ends are at least ½ inch from said membrane when the inner diameter of said housing is approximately .120 inch and said powder is MgO.

References Cited

UNITED STATES PATENTS

| | | | |
|---|---|---|---|
| 2,381,058 | 8/1945 | Jones | 136—232 |
| 2,587,391 | 2/1952 | Seaver | 136—235 |
| 2,617,002 | 11/1952 | Hasley | 174—77 |
| 2,703,335 | 3/1955 | Andrus | 136—224 |
| 2,707,198 | 4/1955 | Jones | 136—235 |
| 2,768,424 | 10/1956 | Andrus | 136—212 X |
| 2,794,059 | 5/1957 | Smith | 136—230 |
| 2,794,062 | 5/1957 | McCall | 136—229 X |

FOREIGN PATENTS

| | | |
|---|---|---|
| 794,337 | 4/1958 | Great Britain. |
| 854,570 | 11/1960 | Great Britain. |

ALLEN B. CURTIS, *Primary Examiner.*

U.S. Cl. X.R.

174—77